(12) United States Patent
Chininis et al.

(10) Patent No.: US 8,127,971 B1
(45) Date of Patent: Mar. 6, 2012

(54) FROSTING DISPENSER WITH REMOVABLE AND WASHABLE CARTRIDGE ASSEMBLY AND CARTRIDGE ASSEMBLY FILLING DISK AND FILLING METHOD

(76) Inventors: Steve Chininis, Norcross, GA (US); Mel Kennedy, Lantana, FL (US); Richard C. Levy, Boca Raton, FL (US); Jose Longoria, Miami, FL (US); Susan Matsumoto, Lantana, FL (US)

( * ) Notice: Subject to any disclaimer, the term of this patent is extended or adjusted under 35 U.S.C. 154(b) by 1106 days.

(21) Appl. No.: 11/895,913

(22) Filed: Aug. 28, 2007

Related U.S. Application Data

(60) Provisional application No. 60/841,127, filed on Aug. 28, 2006, provisional application No. 60/858,660, filed on Nov. 14, 2006.

(51) Int. Cl.
*G01F 11/00* (2006.01)
(52) U.S. Cl. ............ 222/333; 222/1; 222/325; 222/326; 222/386; 222/568; 222/575; 141/27
(58) Field of Classification Search .......... 222/325–327, 222/386, 389, 567–568, 575, 333, 1; 141/2, 141/5, 26–27, 301, 391
See application file for complete search history.

(56) References Cited

U.S. PATENT DOCUMENTS

| 3,395,704 | A | * | 8/1968 | Max Frey et al. | 604/143 |
| 3,729,031 | A | * | 4/1973 | Baldwin | 141/2 |
| 3,729,032 | A | * | 4/1973 | Tischlinger et al. | 141/2 |
| 4,615,469 | A | * | 10/1986 | Kishi et al. | 222/327 |
| 6,003,736 | A | * | 12/1999 | Ljunggren | 222/309 |
| 6,349,850 | B1 | * | 2/2002 | Cheikh | 222/1 |

* cited by examiner

*Primary Examiner* — Frederick C. Nicolas
(74) *Attorney, Agent, or Firm* — Frank L. Kubler

(57) ABSTRACT

A dispenser system for flowable material includes several interchangeable cartridge assemblies for retaining flowable material, each cartridge assembly including a dispensing piston sealingly and slidably retained within a cylinder, the cylinder having a distal cylinder dispensing end to which a material passing attachment can be sealingly mounted and having a proximal cylinder mounting end, and the piston including a piston head for creating the slidable seal within the cylinder and a piston drive mechanism connected to the piston; a drive structure for engaging and mounting the cartridge assembly and for progressively driving the flowable material out of the cartridge assembly and onto a target surface, the drive structure including a cartridge assembly engagement structure and having a piston drive mechanism which drivably and releasibly engages the piston drive mechanism upon fitting the cylinder to the engagement structure.

23 Claims, 10 Drawing Sheets

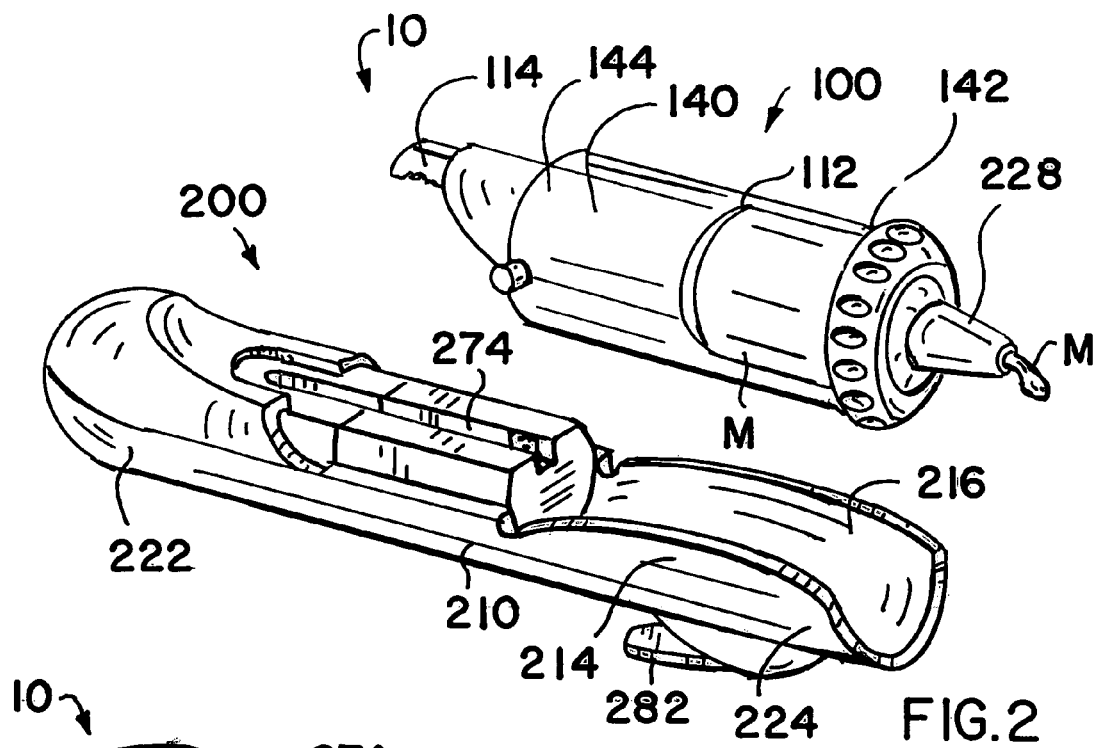
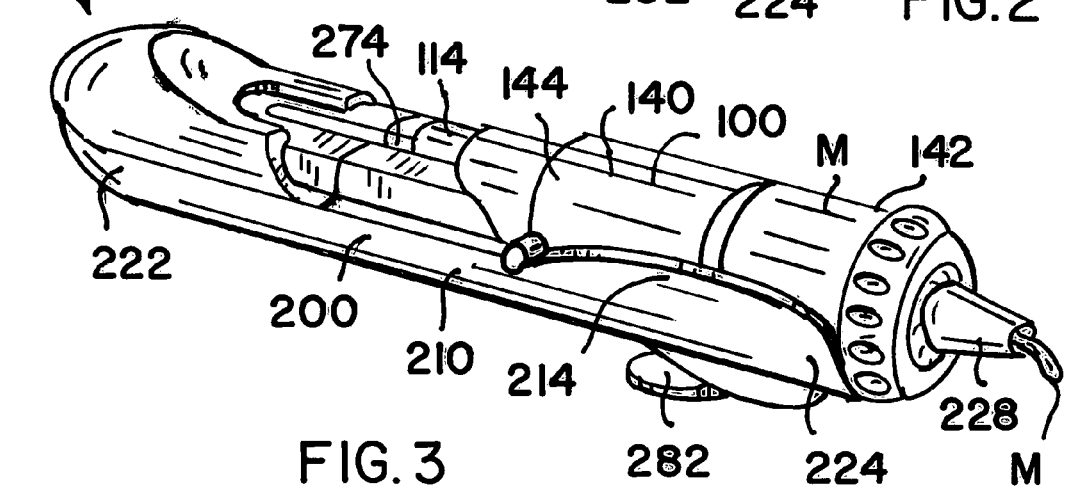

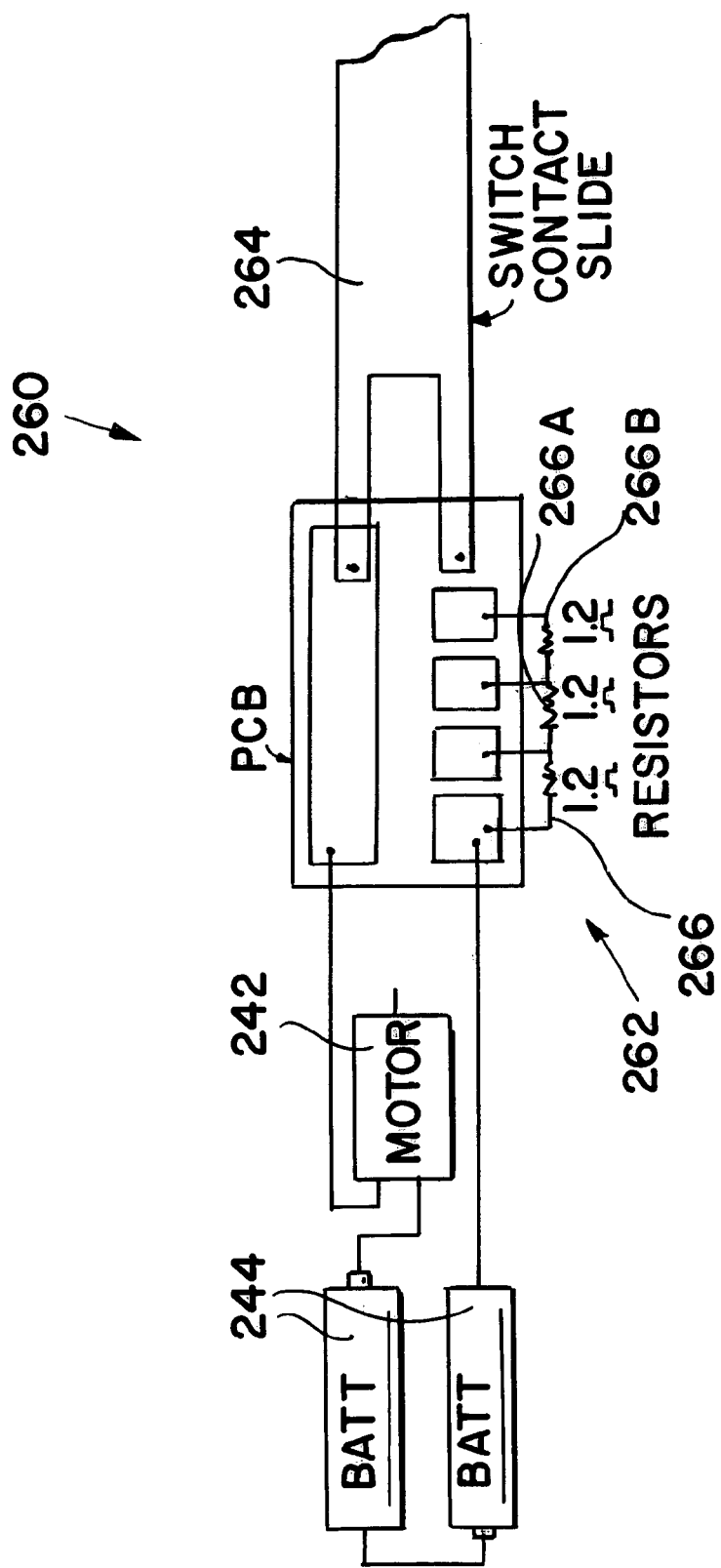

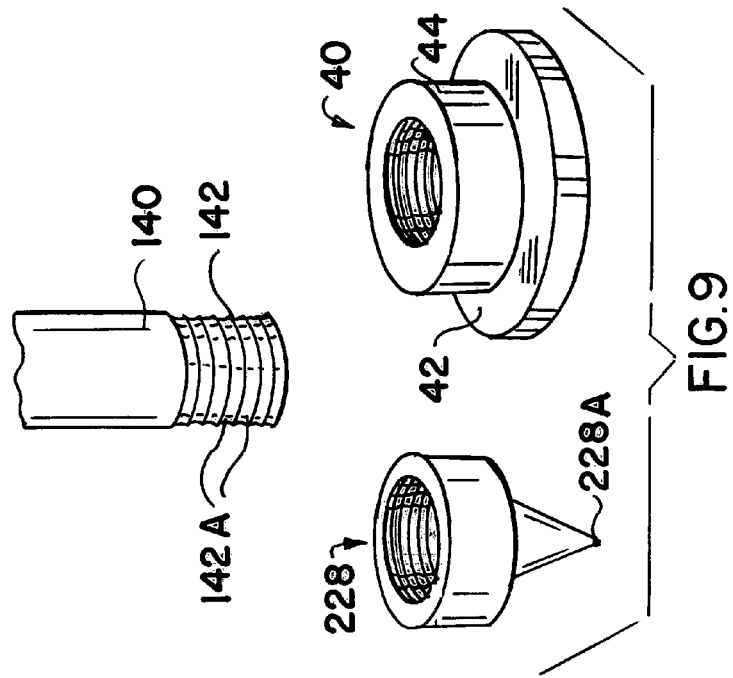
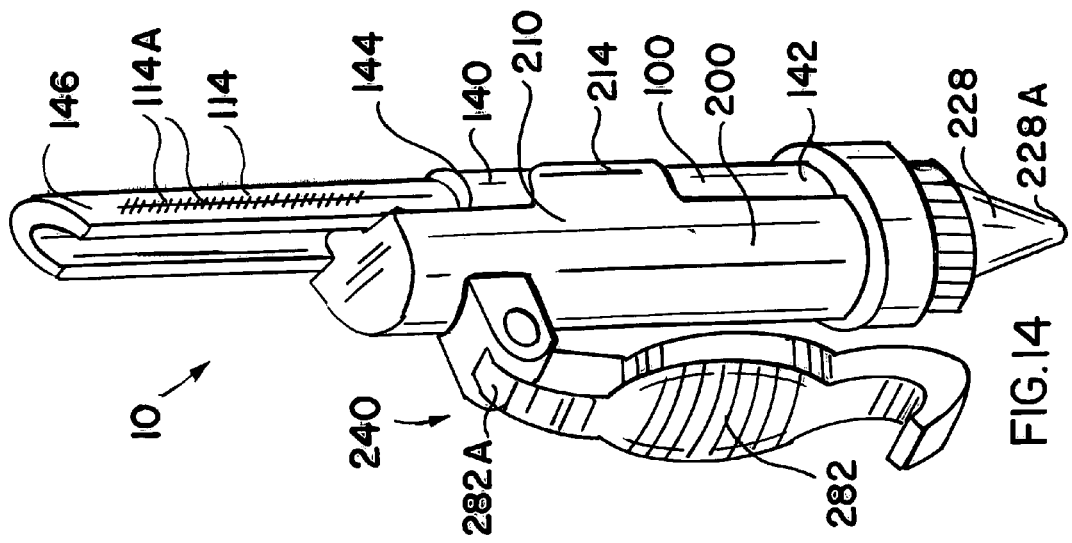

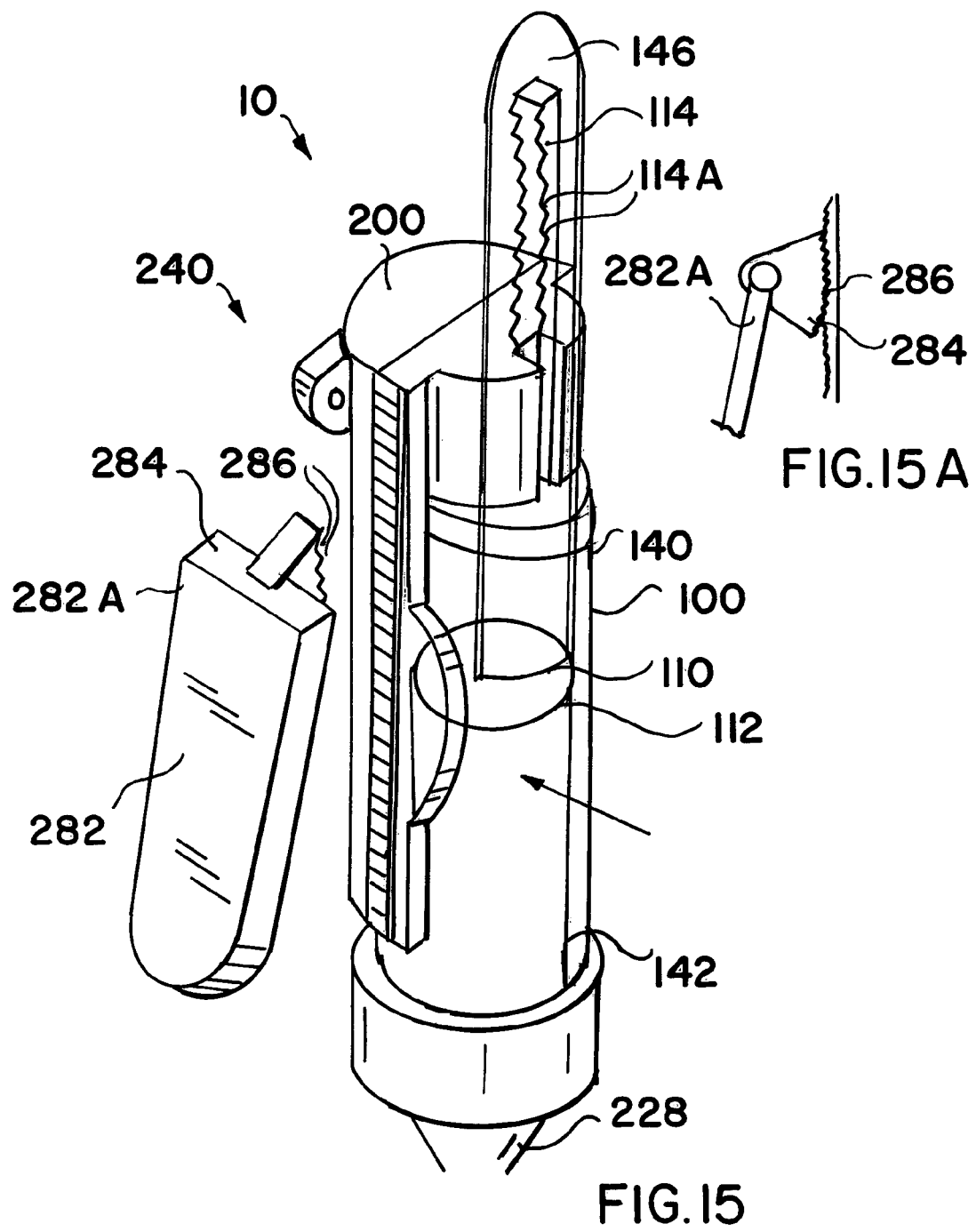

FROSTING DISPENSER WITH REMOVABLE AND WASHABLE CARTRIDGE ASSEMBLY AND CARTRIDGE ASSEMBLY FILLING DISK AND FILLING METHOD

This application continues from provisional application No. 60/841,127 filed on Aug. 28, 2006 and from provisional application No. 60/858,660 filed on Nov. 14, 2006.

BACKGROUND OF THE INVENTION

1. Field of the Invention

The present invention relates generally to the field of bakery equipment and icing dispensing devices. More specifically the present invention relates to a flowable material dispenser such as for dispensing frosting onto bakery products. The dispenser includes a cartridge assembly for retaining flowable material such as frosting and which is detachable and washable and a drive structure for engaging the cartridge assembly and progressively driving the material out of the cartridge assembly and onto a target surface. The cartridge assembly includes a dispensing piston sealingly and slidably retained within a cylinder, the cylinder having a distal cylinder dispensing end to which a selected flow shaping nozzle or an annular filling disk can be sealingly mounted and having a proximal cylinder mounting end with a proximally extending cartridge assembly mounting protrusion, and the piston including a piston head for creating the slidable seal within the cylinder and a rack in the form of a slat with a series of rack gear teeth along its length and connected to and protruding proximally from the piston head out of the cylinder and along to the cartridge assembly mounting protrusion. The drive structure includes a cartridge assembly engagement structure preferably in the form of a cross-sectionally arched channel having a cartridge assembly engagement structure in the form of inwardly angled engagement portions spaced such that the cylinder can be forcibly passed between the engagement portions into or out of the channel by spreading the engagement portions against the resilient biasing of the curved body of the channel. The channel has a channel proximal end and a channel distal end, and contains a piston drive mechanism which drivably and releasibly engages the piston rack upon fitting the cylinder into the channel, for driving the piston proximally to draw flowable material such as frosting into the cylinder and distally to dispense the flowable material out of the cartridge assembly through a nozzle mounted to the cylinder dispensing end. The piston drive mechanism preferably includes an electric drive motor mounted within the channel proximal end and electrically connected through a dispenser circuit to a power source such as batteries also mounted within the channel, the motor having a motor drive shaft drivably connected to a speed reducing gear train which in turn drives a pinion gear, the pinion gear drivably engaging the rack gear teeth upon fitting the cylinder into the channel.

The cylinder dispensing end of the cylinder preferably has cylinder external threads, and at least one nozzle and preferably several nozzles having a variety of differently shaped nozzle dispensing openings are provided having nozzle internal threads for individually screwing onto the cylinder dispensing end. The filling disk permits delivery of flowable material from the can into the cartridge assembly cylinder while keeping the material in the can level, smooth and uniform across its upper surface. The filling disk preferably has a disk outer diameter substantially matching the can inner diameter so that the level of the material in the can drops uniformly across the surface of the material.

2. Description of the Prior Art

There have long been dispensers for flowable food such as frosting. When these dispensers, which may also be called extruders are filled, a cook must spoon out the mixture from a mixing container into a pastry bag or dispenser container. This is a time-consuming, laborious and messy process that is extremely inconvenient, requiring the use of numerous mixing bowls, spoons and spatulas. This process of filling also creates air pockets that require further manipulation of the pastry bag or dispenser, thereby further slowing the dispensing of the mixture. In the case of pre-prepared frosting mixtures, the same problems and inconveniences apply. Thus a need exists for a device that makes the filling of a pastry dispenser or extruder faster, more convenient and neater, especially when using containers of pre-prepared frostings, which are designed specifically to be a time-saving convenience for consumers.

Additionally, previous methods of emptying extruders or pastry bags required either time-consuming and messy manual removal with spoons or spatulas or the wastage of leftover filling.

It is thus an object of the present invention to provide a flowable material dispenser having one or more material retaining cartridge assemblies which can be attached to and detached from a drive structure without tools and washed. The cartridge assemblies may filled from cans or tubs of material or may be provided pre-filled.

It is another object of the present invention to provide such a dispenser which can be filled quickly with flowable material and without use of a spoon or other implement, and which leaves virtually no wasted material.

It is still another object of the present invention to provide such a dispenser which provides side loading of the material cartridge assembly regardless of the amount of flowable material left in the cartridge assembly, and has a drive structure with a C-shaped cross-section permitting the piston within the cartridge to slide along and beside the drive motor or other drive mechanism housing, and includes an electronic control embodiment of the motor actuating switch which permits the motor to reverse for easy stopping of material flow with no accidental exit of the flowable material.

It is finally an object of the present invention to provide such a dispenser which is ergonomically configured, sturdy, reliable and inexpensive to manufacture,

SUMMARY OF THE INVENTION

The present invention accomplishes the above-stated objectives, as well as others, as may be determined by a fair reading and interpretation of the entire specification.

A dispenser for flowable material is provided, including a cartridge assembly for retaining flowable material, the cartridge assembly including a dispensing piston sealingly and slidably retained within a cylinder, the cylinder having a distal cylinder dispensing end to which a material passing attachment can be sealingly mounted and having a proximal cylinder mounting end with a proximally extending cartridge assembly mounting protrusion, and the piston including a piston head for creating the slidable seal within the cylinder and a rack in the form of a slat with a series of rack gear teeth along its length and connected to and protruding proximally from the piston out of the cylinder and along to the cartridge assembly mounting protrusion; and a drive structure for engaging and mounting the cartridge assembly and progressively driving the flowable material out of the cartridge assembly and onto a target surface, the drive structure comprising a cartridge assembly engagement structure and having a channel distal end and a channel proximal end, the channel containing a piston drive mechanism which drivably and releasibly engages the piston rack upon fitting the cylinder into the channel, for driving the piston distally to dispense the flowable material out of the cartridge assembly through the cylinder dispensing end.

The drive structure preferably includes a cross-sectionally arched channel having inwardly angled engagement portions spaced so that the cylinder can be forcibly passed between the engagement portions into or out of the channel against the resilient biasing of the engagement portions. The piston drive mechanism preferably includes an electric drive motor mounted within the channel proximal end and electrically connected through a dispenser circuit to a power source, the drive motor having a motor drive shaft drivably connected to a speed reducing gear train which in turn drives a pinion gear, the pinion gear drivably engaging the rack gear teeth on the rack upon mounting of the cartridge assembly to the drive structure. The power source preferably includes a battery mounted within the channel.

The dispenser preferably additionally includes spaced apart and laterally extending first and second motor retaining walls in the channel, where the drive motor is retained between the first and second motor retaining walls. The dispenser preferably additionally includes first and second battery nesting walls in the channel, each battery nesting wall having a nest recess, where the battery is removably fitted into the nesting recesses in the first and second a battery nesting walls. The dispenser preferably still additionally includes a drive mechanism cover removably fitting over the motor and the battery and removably connected to the channel. The dispenser circuit preferably includes an actuation switch. The actuation switch preferably includes speed selection switch settings. The circuit preferably includes automatic piston reversing means for momentarily reversing the flow of electric current through the motor to reverse the rotational direction of motor. The gear train preferably includes a series of spur gear and worm gear combinations between the motor drive shaft and the pinion gear, each spur gear and worm gear combination slowing the speed of rotation and proportionately increasing the torque of the pinion gear.

The cylinder dispensing end of the cylinder preferably has cylinder external threads, and at least one nozzle preferably is provided having a nozzle dispensing opening with nozzle internal threads for individually screwing onto the cylinder dispensing end. The nozzle preferably includes an internally threaded nozzle collar and a nozzle tip for engagement and mounting with the nozzle collar. The dispenser preferably includes several the nozzles having several differently shaped dispensing openings.

The material passing attachments preferably include an annular filling disk having a circular panel with a material passing disk opening at its center and a tubular flange connected to the circular panel and encompassing the material passing disk opening for fitting onto the cylinder dispensing end; so that the filling disk is fitted to the cylinder dispensing end, the disk is inserted into the open top of a can of flowable material and flat against material in the can, the flowable material is delivered through the disk opening and into the cylinder by pressing the dispenser and attached filling disk downwardly against the material in the can to drive the material into the cylinder. The filling disk preferably has a disk outer diameter Substantially matching the can inner diameter so that the level of material in the can drops uniformly across the surface of the material. At least part of the nozzle preferably is constructed of transparent plastic so that the type and quantity of flowable material within the nozzle is visible.

A dispenser for flowable material is further provided, including a cartridge assembly for retaining flowable material, the cartridge assembly including a dispensing piston sealingly and slidably retained within a cylinder, the cylinder having a distal cylinder dispensing end to which a material passing attachment can be sealingly mounted and having a proximal cylinder mounting end, and the piston comprising a piston head for creating the slidable seal within the cylinder and rack means with a series of rack gear teeth along its length and connected to and protruding proximally from the piston; a drive structure for engaging and mounting the cartridge assembly and for progressively driving the flowable material out of the cartridge assembly and onto a target surface, the drive structure including a cartridge assembly engagement structure and having a piston drive mechanism which drivably and releasibly engages the piston rack means upon fitting the cylinder into the engagement structure, for driving the piston distally to dispense the flowable material out of the cartridge assembly through the cylinder dispensing end; a material passing attachment which is at least one of: a nozzle comprising a nozzle dispensing opening, and an annular filling disk comprising a circular panel with a material passing disk opening and a tubular flange connected to the circular panel and encompassing the material passing disk opening for fitting onto the cylinder dispensing end, the tubular flange including a disk stop structure within and connected to the tubular flange.

A dispenser system for flowable material is still further provided, including several interchangeable cartridge assemblies for retaining flowable material, each cartridge assembly including a dispensing piston sealingly and slidably retained within a cylinder, the cylinder having a distal cylinder dispensing end to which a material passing attachment can be sealingly mounted and having a proximal cylinder mounting end, and the piston including a piston head for creating the slidable seal within the cylinder and piston drive means connected to the piston; a drive structure for engaging and mounting the cartridge assembly and for progressively driving the flowable material out of the cartridge assembly and onto a target surface, the drive structure including a cartridge assembly engagement structure and having a piston drive mechanism which drivably and releasibly engages the piston drive means upon fitting the cylinder to the engagement structure, for driving the piston distally to dispense the flowable material out of the cartridge assembly through the cylinder dispensing end.

A filling disk is provided for mounting on a dispenser having a dispenser cartridge assembly and a cartridge discharge structure, for insertion into a can of flowable material, including an annular filling disk having a circular panel with a material passing disk opening and a tubular flange connected to the circular panel and encompassing the material passing disk opening for receiving the cartridge discharge structure, the tubular flange including a disk stop structure within and connected to the tubular flange for abutting the cartridge discharge structure; so that the filling disk can be inserted into the open top of a can of flowable material and flat against material in the can, the flowable material is delivered through the disk opening and into the dispenser cartridge assembly by pressing the dispenser and attached filling disk downwardly against the material in the can to drive the disk stop structure against the cartridge discharge structure and to drive material into the dispenser cartridge assembly. The disk stop structure preferably is a shoulder in the form of a radial flange protruding inwardly from tubular flange.

A method of delivering flowable material into the cartridge assembly of a dispenser, including the steps of: fitting the filling disk to the cylinder dispensing end; inserting the disk is inserted into the open top of a can of flowable material flat against the exposed surface of the material; and pressing the cartridge assembly and attached filling disk downwardly against the material in the can and thereby driving the material into the cylinder.

BRIEF DESCRIPTION OF THE DRAWINGS

Various other objects, advantages, and features of the invention will become apparent to those skilled in the art from the following discussion taken in conjunction with the following drawings, in which:

FIG. 2 is a perspective view of the dispenser of FIG. 1 with the cartridge assembly separated from the drive structure and positioned for mounting to the drive structure.

FIG. 3 is a perspective view of the dispenser of FIG. 2 showing the cartridge assembly mounted to the drive structure.

FIG. 6 is a circuit diagram of the dispenser circuit.

FIG. 9 is a broken away view of the cylinder dispensing end and two material passing attachments in the form of a nozzle and a filling disk.

FIG. 14 is a perspective view of the second preferred embodiment of the dispenser having a lever driven piston drive means rather than motor powered.

FIG. 15 is perspective view of the dispenser of FIG. 14 shown transparent, with the drive lever detached.

FIG. 15A is a side view of the drive lever.

DETAILED DESCRIPTION OF THE PREFERRED EMBODIMENTS

Figure 1:
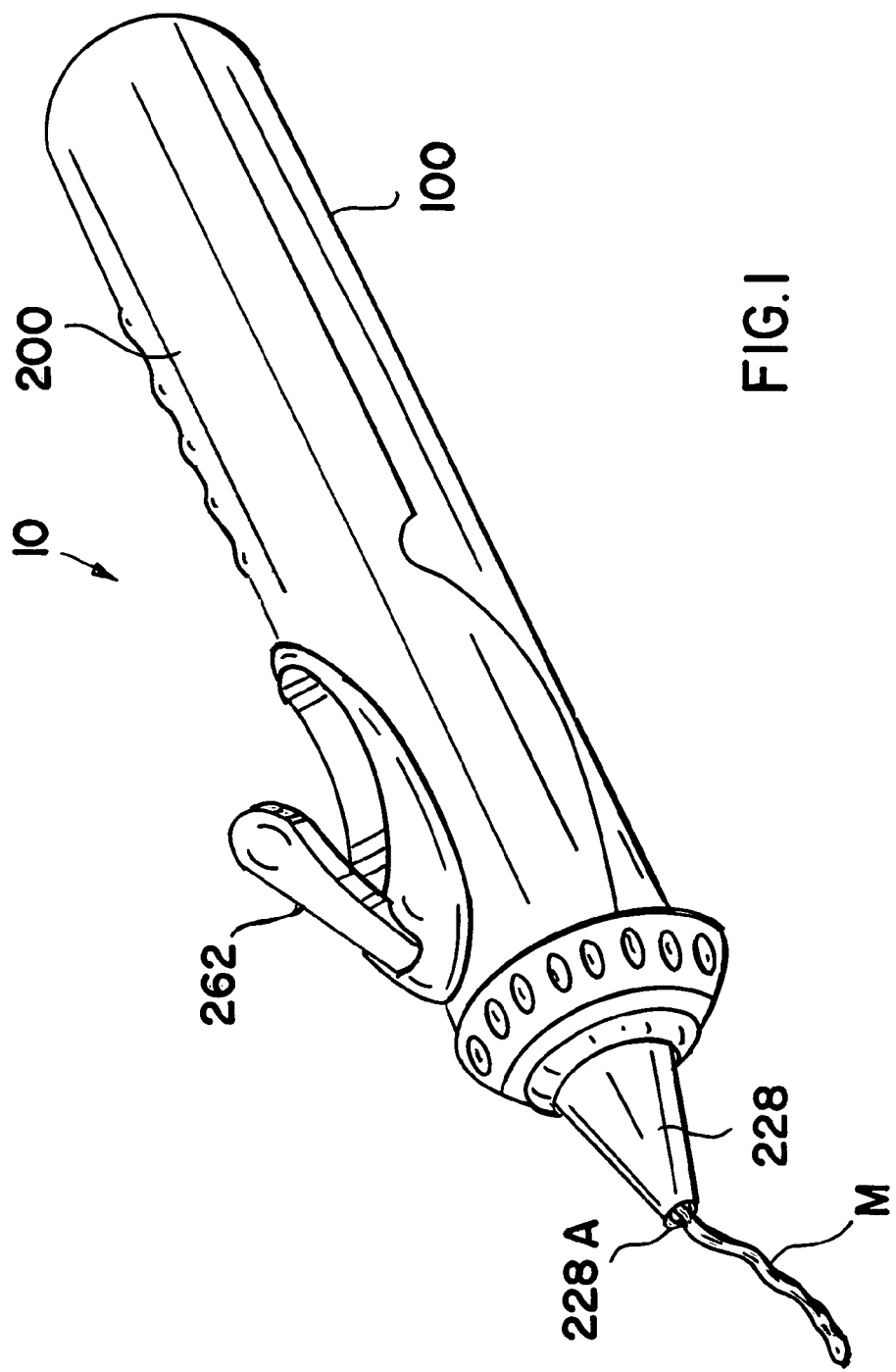
FIG. 1 is a perspective view of the first preferred embodiment of the dispenser with some flowable material flowing from the nozzle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 4:
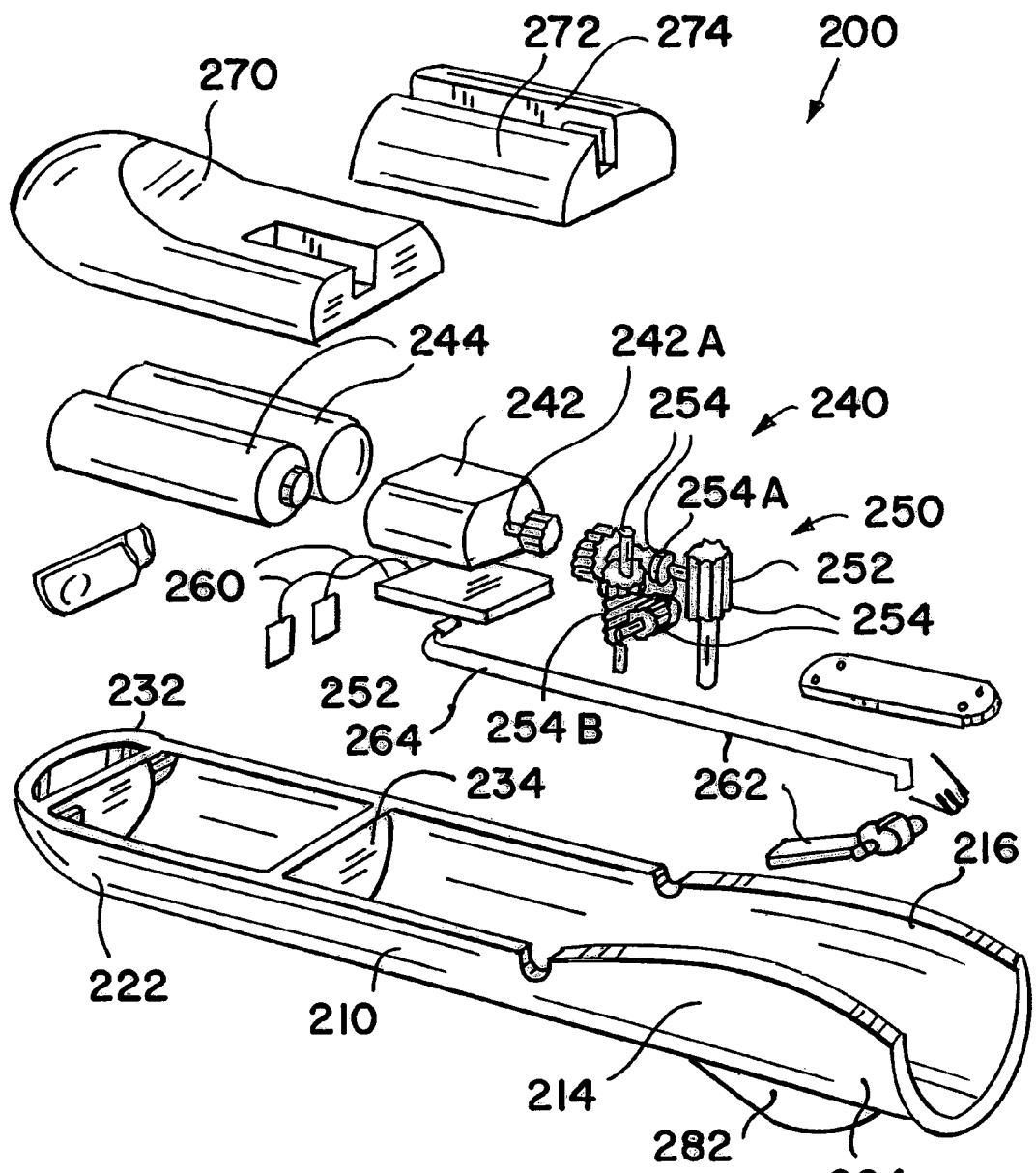
FIG. 4 is an exploded view of the preferred drive structure.
Figure 5:
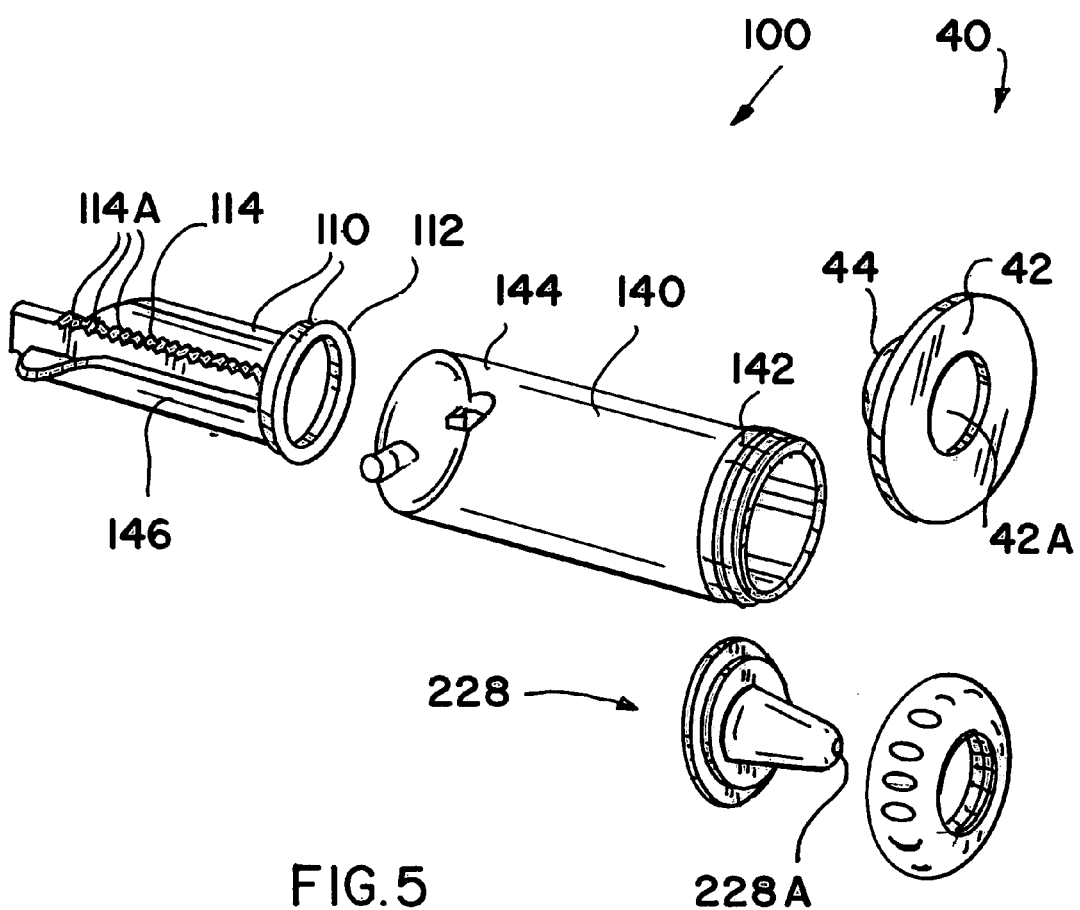
FIG. 5 is an exploded view of the preferred cartridge assembly.
Figure 8:
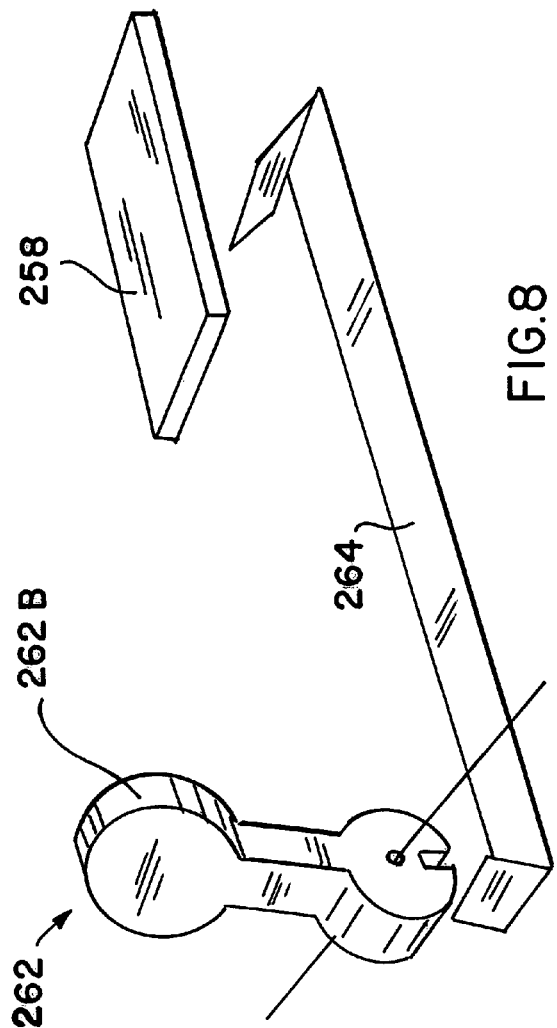
FIG. 8 is a perspective view of the elements of the circuit switch including the conductive sliding strip and switch lever.
Figure 7:
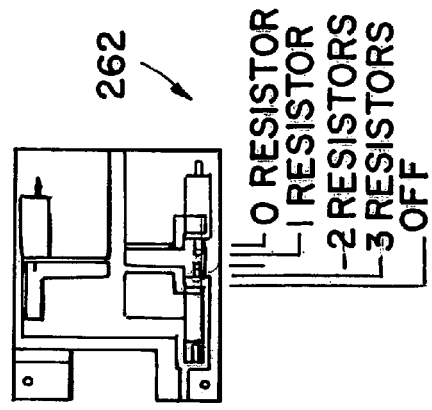
FIG. 7 is a schematic view of the dispenser circuit.
Figure 12:
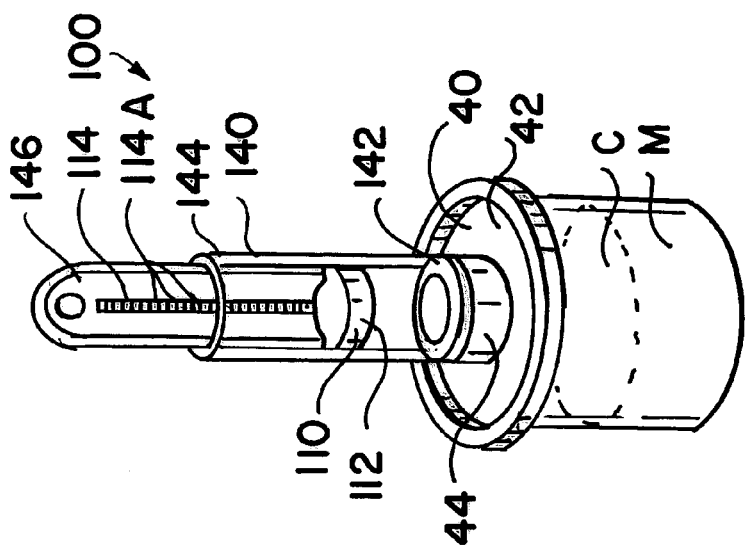
FIG. 12 is a view as in FIG. 9 with the cylinder distal end and attached filling disk fitted into the open top of a can of flowable material.
Figure 10:
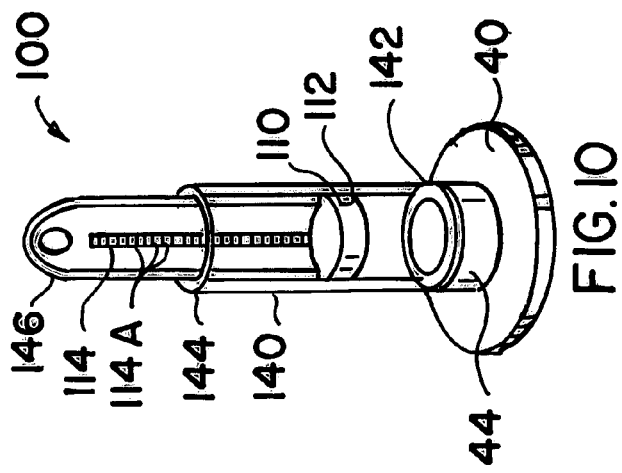
FIG. 10 is a perspective view of the dispenser with a filling disk attached and the cylinder wall broken away to reveal the cylinder.
Figure 11:
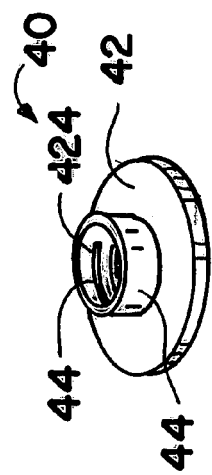
FIG. 11 is a perspective view of the preferred filling disk.
Figure 13:
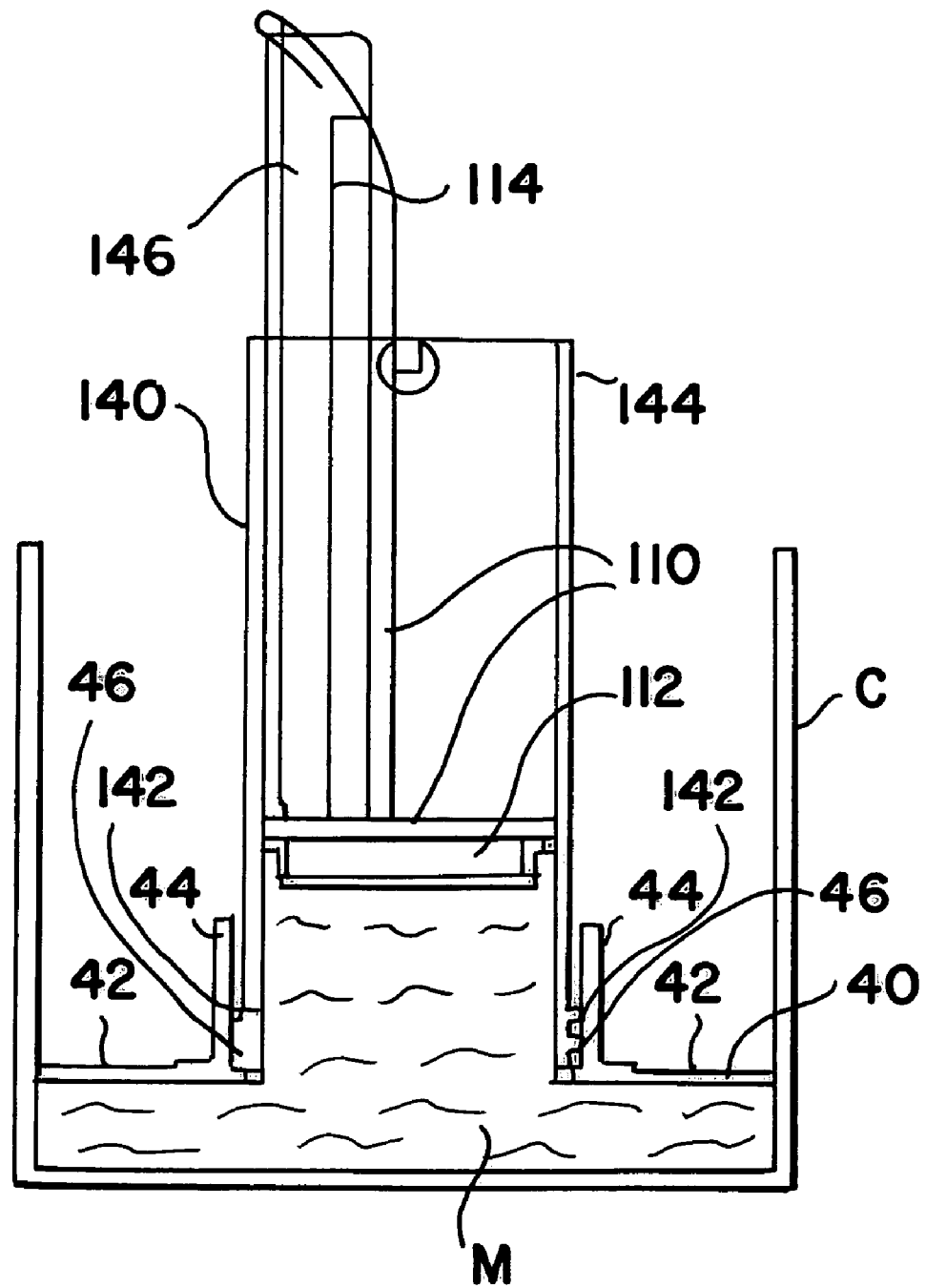
FIG. 13 is a cross-sectional side view of the dispenser and can of FIG. 11 showing material being drawn into the cylinder of the cartridge assembly.

Referring to FIGS. 1-15A, a dispenser 10 is disclosed including a cartridge assembly 100 for retaining flowable material M such as frosting and which is detachable and washable and a drive structure 200 for engaging the cartridge assembly 100 and progressively driving the material M out of the cartridge assembly 100 and onto a target surface TS such as the top of a bakery product.

The cartridge assembly 100 includes a dispensing piston 110 sealingly and slidably retained within a cylinder 140. The cylinder 140 has a distal cylinder dispensing end 142 to which a material passing attachment such as a selected flow shaping nozzle 20 or an annular filling disk 40 can be sealingly mounted and has a proximal cylinder mounting end 144 with a proximally extending cartridge assembly mounting protrusion 146. The piston 110 includes a piston head 112 for creating the slidable seal within the cylinder 140 and a piston rack 114 in the form of a slat with a series of rack gear teeth 114A along its length and connected to and protruding proximally from the piston head 112 out of the cylinder 140 and along to the cartridge assembly mounting protrusion 146.

The drive structure 200 preferably includes a cross-sectionally arched channel 210 having inwardly angled engagement portions 214 and 216 spaced such that the cylinder 140 can be forcibly passed between the engagement portions 214 and 216 into or out of the channel 210 and by spreading the engagement portions 214 and 216 against the resilient biasing of the channel 210. The channel 210 has a channel proximal end 222 and a channel distal end 224 and contains a piston drive mechanism 240 which drivably and releasibly engages the piston rack 114 upon fitting the cylinder 140 into the channel 210, for driving the piston 110 distally to dispense the flowable material M out of the cartridge assembly 100 through a nozzle 228 mounted to the cylinder dispensing end 142, and optionally in reverse rotation for driving the piston 110 proximally to draw flowable material M such as frosting into the cylinder 140. The piston drive mechanism 240 preferably includes an electric drive motor 242 mounted within the channel proximal end 222 and electrically connected through a dispenser circuit 260 to a power source such as batteries 244 also mounted within the channel 210, the motor 242 having a motor drive shaft and shaft gear 242A drivably connected to a speed reducing gear train 250 which in turn drives a pinion gear 252, the pinion gear 252 drivably engaging the rack gear teeth 114A upon fitting the cylinder 140 into the channel 210.

The drive motor 242 preferably is retained between spaced apart and laterally extending first and second motor retaining walls 232 and 234 in the channel 210, and the batteries 244 preferably are retainingly fitted into first and second battery nesting walls 236 and 238 each having first and second nesting recesses 236A and 238A into which first and second batteries 244 are removably fitted. A drive mechanism cover 270 is fitted over the motor 242 and batteries 244 and is removably connected to the edges of the channel 210 or of the retaining walls 232 and 234. The cover 270 preferably has continuing wall portions (not shown) of the first and second motor retaining walls 232 and 234, registering and becoming contiguous with the first and second motor retaining walls 232 and 234.

The dispenser circuit 260 includes an actuation switch 262, and the actuation switch 262 optionally includes speed selection switch settings and is operated with a switch lever 262B. A conductive slide strip 264 slides across speed selection switch contacts 266, 266A and 266B in the form of a longitudinally spaced series of outwardly protruding first, second and third resistors respectively on the PCB board 258 to determine speed of motor 242. Contact between the conductive slide strip 264 and the first resistor completes the circuit 260 and permits electric current to flow rapidly through the motor 242 so that the motor 242 runs at higher speed to dispense flowable material M at a rapid rate, contact between the strip 264 and both the first and second resistor causes the current to flow at a medium rate so that the motor 242 runs at medium speed, and contact between the strip 264 and the first, second and third resistors simultaneously causes the current to flow at a slower rate so that the motor 242 runs at a slower speed. The conductive slide strip 264 is slidably mounted in a strip channel 274 in a channel guide 272. See FIGS. 4 and 6. A preferred feature incorporated into PCB board 258 is automatic momentary motor 242 reversal to draw the piston 110 slightly proximally to in turn draw any left over material M protruding from the cartridge assembly 100 distal end back into the cartridge assembly 100 or nozzle 228 on cartridge assembly 100.

The gear train 250 more specifically preferably includes a series of meshing spur gear and worm gear combinations 254 between the motor drive shaft 242A and the pinion gear 252. For each spur gear and worm gear combination 254, the spur gear 254A and the worm gear 254B of each combination 254 being mounted on mutually perpendicular shafts substantially slows the speed of rotation and proportionately increases the torque of the pinion gear 252 which drives the rack 114. See FIG. 4.

The cylinder dispensing end 142 of the cylinder 140 preferably has cylinder external threads 142A, and a nozzle 228 and a filling disk 40 are alternatively and interchangeably fitted onto the cylinder dispensing end 142. The nozzle 228 preferably has nozzle internal threads 228E so that the nozzle 228 screws onto the cylinder dispensing end 142 so that the pressure of material M being discharged through the nozzle 228 does not dislodge the nozzle 228. The filling disk 40 preferably does not have internal threads and just slides onto the cylinder dispensing end 142 over the cylinder external threads 142A until the cylinder dispensing end 142 abuts a disk stop structure inside the filling disk 40. Since the material M is flowing into rather than out of the cylinder dispensing end 142 during filling disk 40 use, the filling disk 40 is held in place rather than dislodged by the material M flow, and as a result no internal threads are needed in the filling disk 40. This slide-on mounting and slide-off dismounting of the filling disk 40 makes mounting fast and easy, the absence of filling disk 40 internal threads makes disk 40 molding substantially less expensive, and prevents the user from trying to suck the material M such as frosting out by pulling the piston 110 proximally, forcing the user to press the cartridge assembly 100 and filling disk 40 into the material M in the can C, permitting a lower cost manufacturing method to make the seal between the moving parts in the cartridge assembly 100.

At least one nozzle 228 and preferably several nozzles 228 are provided having a variety of differently shaped nozzle dispensing openings 228A are provided. The nozzle 228 preferably includes a nozzle funnel 228B having a radially protruding flange or nozzle shoulder 228C and includes a separate nozzle collar 228D having an inwardly protruding collar flange 228E so that the collar 228D can fit around the nozzle funnel 228B and the collar flange 228E sealingly abuts the nozzle shoulder 228C. For this two-part nozzle 228 version, the several nozzle funnels 228B are provided with different nozzle dispensing openings 228A. For either the one-piece or two-piece nozzle 228 version, the nozzle funnel 228B portion preferably is formed of transparent plastic so that the user can see the color of the particular flowable material M, such as a particular flavor of frosting, inside the nozzle 228 and also see the position and progress of material M entering and passing through the nozzle funnel 228B to anticipate exactly when the material M will exit the nozzle 228.

The annular filling disk 40 preferably includes a circular panel 42 having a material passing disk opening 42A at its center and a tubular flange 44 integral with the circular panel 42 and concentric with and protruding from the periphery of the material passing disk opening 42A for slidably fitting onto the cylinder dispensing end 142 as mentioned above. The tubular flange 44 preferably contains the disk stop structure in the form of an internally protruding radial flange or disk shoulder 46. It is alternatively contemplated, although less preferred, that the tubular flange 44 have internal threads to screw onto the cylinder external threads 142A. The filling disk 40 preferably has a disk outer diameter substantially matching the can C inner diameter so that filling disk 40 compresses the entire exposed surface of the material M toward the bottom of the can C so that no air bubbles are formed in the material M entering the cartridge assembly 100, and so that the level of material M in the can C drops uniformly across an exposed smooth surface of material M.

Preferred Method of Filling the Cartridge Assembly

The filling disk 40 is fitted to the cylinder dispensing end 142, then the disk 40 is inserted into the open top of a can C of flowable material M such as a standard frosting tub and flat against the exposed surface of the material M. The filling disk 40 permits delivery of flowable material M from the can C into the cartridge assembly cylinder 140 while keeping the material M in the can C level and uniform across the material M upper surface. The flowable material M is delivered through the disk opening 42A and into the cylinder 140 by pressing the cartridge assembly 100 and attached filling disk C downwardly against the material M in the can C to drive the material M into the cylinder 140. It is alternatively contemplated that the piston 110 be withdrawn in the proximal direction to draw some material M from the can C.

For all embodiments, the nonmetallic parts optionally are formed of transparent plastic so that the color or type of flowable material M within the cartridge assembly 100 can be seen and the needed cartridge assembly 100 thereby selected. The transparent plastic construction also permits determination at a glance how much flowable material M remains in the given cartridge assembly 100. This is an extension of the stated advantages of the above-described transparent nozzle funnel 228B.

Second Preferred Embodiment

A second preferred embodiment of dispenser 10 is substantially like the first except that the motorized piston drive means 240 is replaced by an entirely mechanical piston drive means 240. Drive means 240 includes a drive lever 282 pivoting about a lever mounting end 282A and having an arched rack engaging surface 284 with drive gear teeth 286.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A dispenser for flowable material, comprising:
a cartridge assembly for retaining flowable material, said cartridge assembly comprising a dispensing piston sealingly and slidably retained within a cylinder, the cylinder having a distal cylinder dispensing end to which a material passing attachment can be sealingly mounted and having a proximal cylinder mounting end with a proximally extending cartridge assembly mounting protrusion, and the piston including a piston head for creating a slidable seal within the cylinder and a rack comprising a slat with a series of rack gear teeth along its length and connected to and protruding proximally from the piston out of the cylinder and along to the cartridge assembly mounting protrusion;

and a drive structure for engaging and mounting said cartridge assembly and progressively driving the flowable material out of said cartridge assembly and onto a target surface, said drive structure comprising a cartridge assembly engagement structure and having a channel distal end and a channel proximal end, said channel containing a piston drive mechanism which drivably and releasibly engages said piston rack upon fitting said cylinder into said channel, for driving said piston distally to dispense the flowable material out of said cartridge assembly through said cylinder dispensing end.

2. The dispenser of claim 1, wherein said drive structure comprises a cross-sectionally arched channel having inwardly angled engagement portions spaced such that the cylinder can be forcibly passed between the engagement portions into or out of the channel against resilient biasing provided by the engagement portions.

3. The dispenser of claim 1, wherein said piston drive mechanism comprises an electric drive motor having a rotational direction and mounted within said channel proximal end and electrically connected through a dispenser circuit to a power source, said drive motor having a motor drive shaft drivably connected to a speed reducing gear train which in turn drives a pinion gear, such that said pinion gear has a pinion gear speed of rotation and a pinion gear torque, said pinion gear drivably engaging said rack gear teeth on said rack upon mounting of said cartridge assembly to said drive structure.

4. The dispenser of claim 3, wherein said power source comprises a battery mounted within said channel.

5. The dispenser of claim 3, additionally comprising spaced apart and laterally extending first and second motor retaining walls in the channel, wherein said drive motor is retained between said first and second motor retaining walls.

6. The dispenser of claim 5, additionally comprising first and second battery nesting walls in said channel, each battery nesting wall having a nest recess, wherein said battery is removably fitted into said nesting recesses in said first and second a battery nesting walls.

7. The dispenser of claim 5, additionally comprising a drive mechanism cover removably fitting over said motor and said battery and removably connected to said channel.

8. The dispenser of claim 1, wherein said dispenser circuit comprises an actuation switch.

9. The dispenser of claim 8, wherein said actuation switch comprises speed selection switch settings.

10. The dispenser of claim 3, wherein said circuit comprises automatic piston reversing means for momentarily reversing the flow of electric current through said motor to reverse the rotational direction of said motor.

11. The dispenser of claim 3, wherein said gear train comprises a series of spur gear and worm gear combinations between said motor drive shaft and said pinion gear, each said spur gear and worm gear combination slowing said pinion gear speed of rotation and proportionately increasing said pinion gear torque.

12. The dispenser of claim 1, wherein said cylinder dispensing end of the cylinder has cylinder external threads, and at least one nozzle having a nozzle dispensing opening with nozzle internal threads for individually screwing onto said cylinder dispensing end.

13. The dispenser of claim 12, wherein said material passing attachments include a nozzle comprising an internally threaded nozzle collar and a nozzle tip for engagement and mounting with said nozzle collar.

14. The dispenser of claim 12, comprising several said nozzles having several differently shaped dispensing openings.

15. The dispenser of claim 1, wherein said material passing attachments comprise an annular filling disk having a circular panel with a material passing disk opening at its center and a tubular flange connected to said circular panel and encompassing said material passing disk opening for fitting onto said cylinder dispensing end; such that said filling disk is fitted to said cylinder dispensing end, the disk is inserted into the open top of a can of flowable material and flat against material in the can, the flowable material is delivered through the disk opening and into said cylinder by pressing said dispenser and attached filling disk downwardly against the material in the can to drive the material into said cylinder.

16. The dispenser of claim 15, wherein said filling disk has a disk outer diameter substantially matching the can inner diameter such that the level of material in the can drops uniformly across the surface of the material.

17. The dispenser of claim 1, wherein at least part of said nozzle is constructed of transparent plastic such that the type and quantity of flowable material within said nozzle is visible.

18. A dispenser for flowable material, comprising:
a cartridge assembly for retaining flowable material, said cartridge assembly comprising a dispensing piston sealingly and slidably retained within a cylinder, said cylinder having a distal cylinder dispensing end to which a material passing attachment can be sealingly mounted and having a proximal cylinder mounting end, and the piston comprising a piston head for creating a slidable seal within said cylinder and rack means with a series of rack gear teeth along its length and connected to and protruding proximally from said piston;
a drive structure for engaging and mounting said cartridge assembly and for progressively driving the flowable material out of said cartridge assembly and onto a target surface, said drive structure comprising a cartridge assembly engagement structure and having a piston drive mechanism which drivably and releasibly engages said piston rack means upon fitting said cylinder into said engagement structure, for driving said piston distally to dispense the flowable material out of said cartridge assembly through said cylinder dispensing end;
a material passing attachment which is at least one of: a nozzle comprising a nozzle dispensing opening, and an annular filling disk comprising a circular panel with a material passing disk opening and a tubular flange connected to said circular panel and encompassing said material passing disk opening for fitting onto said cylinder dispensing end, said tubular flange comprising a disk stop structure within and connected to said tubular flange.

19. A dispenser system for flowable material, comprising:
a plurality of interchangeable cartridge assemblies for retaining flowable material, each said cartridge assembly comprising a dispensing piston sealingly and slidably retained within a cylinder, said cylinder having a distal cylinder dispensing end to which a material passing attachment can be sealingly mounted and having a proximal cylinder mounting end, and the piston comprising a piston head for creating a slidable seal within said cylinder and piston drive means connected to said piston;

a drive structure for engaging and mounting said cartridge assembly and for progressively driving the flowable material out of said cartridge assembly and onto a target surface, said drive structure comprising a cartridge assembly engagement structure and having a piston drive mechanism which drivably and releasibly engages said piston drive means upon fitting said cylinder to said engagement structure, for driving said piston distally to dispense the flowable material out of said cartridge assembly through said cylinder dispensing end.

20. A filling disk for mounting on a dispenser having a dispenser cartridge assembly and a cartridge discharge structure, for insertion into a can of flowable material having an open top, comprising an annular filling disk having a circular panel with a material passing disk opening and a tubular flange connected to said circular panel and encompassing said material passing disk opening for receiving the cartridge discharge structure, said tubular flange comprising a disk stop structure within and connected to said tubular flange for abutting the cartridge discharge structure;

such that said filling disk can be inserted into said open top of said can of flowable material and flat against material in the can, the flowable material is delivered through the disk opening and into said dispenser cartridge assembly by pressing said dispenser and attached said filling disk downwardly against the material in the can to drive the disk stop structure against the cartridge discharge structure and to drive said material into said dispenser cartridge assembly.

21. The filling disk of claim 20, wherein said disk stop structure is a shoulder in the form of a radial flange protruding inwardly from tubular flange.

22. A method of delivering flowable material into a cartridge assembly of a dispenser, where the dispenser comprises a plurality of interchangeable cartridge assemblies for retaining flowable material, each cartridge assembly comprising a dispensing piston sealingly and slidably retained within a cylinder, the cylinder having a distal cylinder dispensing end to which a material passing attachment can be sealingly mounted and having a proximal cylinder mounting end, and the piston comprising a piston head for creating a slidable seal within the cylinder and piston drive means connected to the piston; a drive structure for engaging and mounting the cartridge assembly and for progressively driving the flowable material out of the cartridge assembly and onto a target surface, the drive structure comprising a cartridge assembly engagement structure and having a piston drive mechanism which drivably and releasibly engages the piston drive means upon fitting the cylinder to the engagement structure, for driving the piston distally to dispense the flowable material out of the cartridge assembly through the cylinder dispensing end; using a material passing attachment comprising a filling disk comprising an annular filling disk having a circular panel with a material passing disk opening at its center and a tubular flange connected to said circular panel and encompassing said material passing disk opening for fitting onto the distal cylinder dispensing end, comprising the steps of:

fitting the filling disk to the cylinder dispensing end;
inserting the disk into the open top of a can of flowable material flat against the exposed surface of the material;
and pressing the cartridge assembly and attached said filling disk downwardly against the material in the can and thereby driving the material into the cylinder.

23. A dispenser for flowable material, comprising:

a cartridge assembly for retaining flowable material, said cartridge assembly comprising a dispensing piston sealingly and slidably retained within a cylinder, the cylinder having a distal cylinder dispensing end to which a material passing attachment can be sealingly mounted and having a proximal cylinder mounting end with a proximally extending cartridge assembly mounting protrusion, and the piston including a piston head for creating a slidable seal within the cylinder and a rack comprising a slat with a series of rack gear teeth along its length and connected to and protruding proximally from the piston out of the cylinder and along to the cartridge assembly mounting protrusion;

and a drive structure for engaging and mounting said cartridge assembly and progressively driving the flowable material out of said cartridge assembly and onto a target surface, said drive structure comprising a cartridge assembly engagement structure and having a channel distal end and a channel proximal end, said channel containing a piston drive mechanism which drivably and releasibly engages said piston rack upon fitting said cylinder into said channel, for driving said piston distally to dispense the flowable material out of said cartridge assembly through said cylinder dispensing end;

wherein said drive structure comprises a cross-sectionally arched channel having inwardly angled engagement portions spaced such that the cylinder can be forcibly passed between the engagement portions into or out of the channel against resilient biasing provided by the engagement portions;

wherein said piston drive mechanism comprises an electric drive motor having a rotational direction mounted within said channel proximal end and electrically connected through a dispenser circuit to a power source, said drive motor having a motor drive shaft drivably connected to a speed reducing gear train which in turn drives a pinion gear, said pinion gear drivably engaging said rack gear teeth on said rack upon mounting of said cartridge assembly to said drive structure;

wherein said power source comprises a battery mounted within said channel;

spaced apart and laterally extending first and second motor retaining walls in the channel, wherein said drive motor is retained between said first and second motor retaining walls;

and a drive mechanism cover removably fitting over said motor and said battery and removably connected to said channel;

wherein said dispenser circuit comprises an actuation switch;

wherein said actuation switch comprises speed selection switch settings;

wherein said circuit comprises automatic piston reversing means for momentarily reversing the flow of electric current through said motor to reverse the rotational direction of said motor.

* * * * *